June 17, 1924.  
F. BOSLER  
1,498,432  
ADJUSTABLE BRACKET FOR HAND MIRRORS  
Filed March 19, 1923

INVENTOR.  
Frank Bosler  
BY  
Geo. P. Kimmel ATTORNEY.

Patented June 17, 1924.

1,498,432

UNITED STATES PATENT OFFICE.

FRANK BOSLER, OF CHILLICOTHE, OHIO.

ADJUSTABLE BRACKET FOR HAND MIRRORS.

Application filed March 19, 1923. Serial No. 626,106.

*To all whom it may concern:*

Be it known that I, FRANK BOSLER, a citizen of the United States, residing at Chillicothe, in the county of Ross and State of Ohio, have invented certain new and useful Improvements in Adjustable Brackets for Hand Mirrors, of which the following is a specification.

This invention relates to an adjustable bracket for hand mirrors, and has for its object to provide in a manner as hereinafter set forth a bracket for such class for conveniently adjusting or positioning a pair of hand mirrors relatively to each other to provide for the reflection from one mirror to the other of the rear of the head so that a person can ascertain the appearance of the back of the head when desired, but it will be understood that an adjustable bracket for hand mirrors in accordance with this invention can be employed for any purposes wherein it is found applicable.

Further objects of the invention are to provide an adjustable bracket for the purpose set forth which is simple in its construction and arrangement, strong, durable, compact, efficient and convenient in its use, readily assembled, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:—

Figure 1:
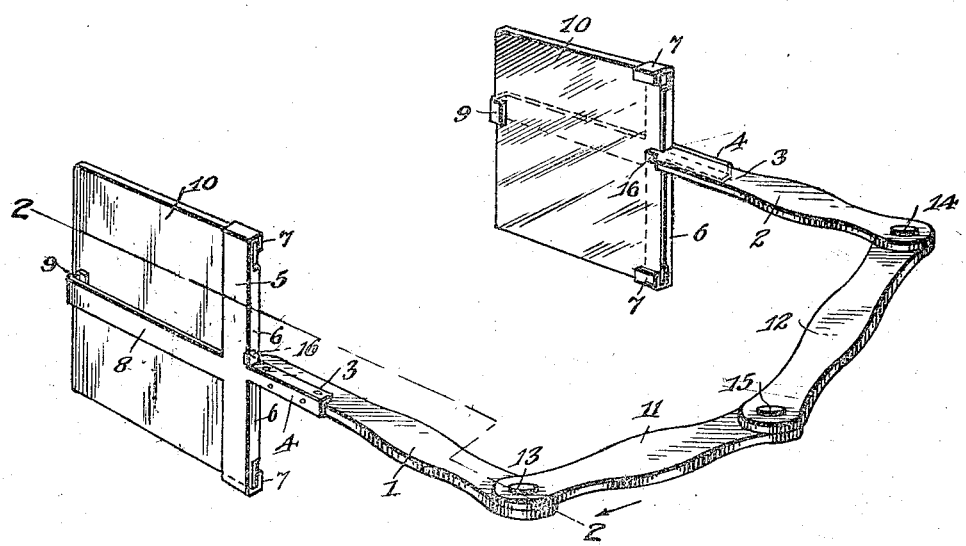
Figure 1 is a perspective view of an adjustable bracket in accordance with this invention showing the adaptation therewith of a pair of hand mirrors, and further illustrating the bracket in an extended position.
Figure 2:
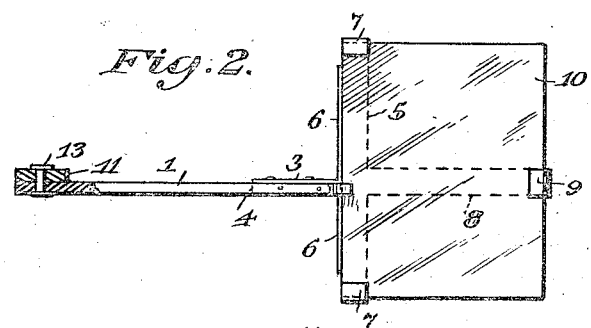
Fig. 2 is a section on line 2—2, Fig. 1.

Referring to the drawings in detail, 1, 2, denote a pair of handle members of the desired length, and to the outer end of each of said members 1, 2, is fixedly secured by the holdfast devices 3, the channel shaped shank 4, of a mirror holder.

Each of the mirror holders not only includes the shank 4, but further includes a supporting bar 5, which is formed integral with the shank 4, and said bar 5 is provided with a flange 6, at one longitudinal edge thereof, and is also provided with an angle shaped extension 7 at each end thereof. The shank 4 is formed integral with the bar 5 intermediate its ends and has the flange 6 abut thereagainst. The flange 6 intermediate its ends is cut away. Formed integral with the bar 5, and projecting forwardly therefrom, is a flat retaining member 8, having its outer end provided with an angle shaped extension 9. The retaining member 8 is formed integral eccentrically of the forward side edge of the bar 5. The member 8 is resilient, so that it can be snapped over the mirror 10, which is mounted in the bar 5, against the flange 6 and overlapped by the extension 7.

The handle members 1, 2, are adjustably connected together, through the medium of a pair of links 11, 12. The link 11 is pivotally connected, as at 13, to and arranged upon the rear end of the handle member 1, and the link 12, is pivotally connected as at 14, to and arranged against the lower face of the rear end of the handle member 2. The links 11 and 12, are pivotally connected together as at 15, and by setting up the links and handle members in the manner as stated, when the bracket is folded, the link 11 is superposed on the handle member 1, the link 12 superposed on the link 11 and the handle member 2 is superposed on the link 12. The manner in which the bracket is folded is clearly shown in Fig. 3.

Each of the handle members 1, 2, is provided at its forward end with a lengthwise extending lug 16 which is flush with the inner side edge of its respective member and which coacts with the angle shaped extensions 7 for maintaining the mirror 10 in position. The lug 16 projects forwardly with respect to the flanges 6 of the holder members.

Figure 3:
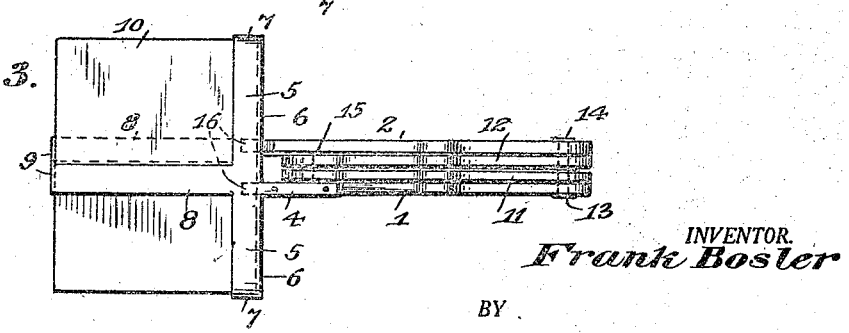
Fig. 3 is a side elevation of the bracket when closed.

The handle members 1, 2, are arranged out of alinement, or rather are connected with the holder members, to one side of the center thereof, so that the bracket can be folded in a manner as shown in Fig. 3. As illustrated the handle member 2 is arranged above the handle member 1 and the handle member 2 is connected to the holder member above the center thereof and the handle member 1 is connected to the other holder member below the center thereof. By this arrangement the bracket can be folded to the position shown in Fig. 3, so that the handle members and links can be arranged in superposed position.

The mirrors can be adjusted to any desired position relative to each other, by angularly adjusting the links 11, 12 with respect to the handle members 1, 2, as is obvious, and the adjustment is such that one mirror can be moved forwardly of the other, or towards or away from each other.

Although the preferred embodiment of the invention is as described and illustrated, yet it is to be understood that changes in the details of construction can be had without departing from the light of the invention as claimed.

What I claim is:

1. A bracket for the purpose set forth comprising a pair of holder members, a handle member connected to one of the holder members between its center and its upper side edge, a handle member connected to the other of the holder members between its center and its lower side edge, a pair of links, one having its inner end mounted upon and pivotally connected to the inner end of the other of the links, means for pivotally connecting the outer end of one of said links against the lower face of one handle member, and means for pivotally connecting the outer end of the other of said links upon the upper face of the other handle member whereby when said bracket is folded the handle members and links will be arranged in superposed relation.

2. A bracket for the purpose set forth comprising a pair of holder members, a handle member connected to one of the holder members between its center and its upper side edge, a handle member connected to the other of the holder members between its center and its lower side edge, a pair of links, one having its inner end mounted upon and pivotally connected to the inner end of the other of the links, means for pivotally connecting the outer end of one of said links against the lower face of one handle member, means for pivotally connecting the outer end of the other of said links upon the upper face of the other handle member whereby when said bracket is folded the handle members and links will be arranged in superposed relation, and each of said holder members provided with a plurality of L-shaped extensions for connecting a mirror therewith, certain of said extensions being disposed at right angles with respect to the other.

3. A bracket for the purpose set forth comprising a pair of holder members, a handle member connected to one of the holder members between its center and its upper side edge, a handle member connected to the other of the holder members between its center and its lower side edge, a pair of links, one having its inner end mounted upon and pivotally connected to the inner end of the other of the links, means for pivotally connecting the outer end of one of said links against the lower face of one handle member, means for pivotally connecting the outer end of the other of said links upon the upper face of the other handle member whereby when said bracket is folded the handle members and links will be arranged in superposed relation, each of said holder members provided with a plurality of L-shaped extensions for connecting a mirror therewith, certain of said extensions being disposed at right angles with respect to the other, and each of said handle members provided with a lengthwise extending lug opposing a holder member.

4. A bracket for the purpose set forth comprising a pair of holder members, each of said members at each end formed with an L-shaped extension and intermediate its ends with a resilient arm extending at right angles with respect to said extensions and terminating at its outer end in an L-shaped extension, said extensions providing means for coupling a mirror to a holder, said holder members provided with eccentrically disposed shanks arranged out of alignment, and a pair of handle members, each of said members fixedly secured to one of said shanks, and a pair of links pivotally connected together, each of said links further pivotally connected to one of the handle members.

5. A bracket for the purpose set forth comprising a pair of holder members, each of said members at each end formed with an L-shaped extension and intermediate its ends with a resilient arm extending at right angles with respect to said extensions and terminating at its outer end in an L-shaped extension, said extensions providing means for coupling a mirror to a holder, said holder members provided with eccentrically disposed shanks arranged out of alignment, a pair of handle members, each of said members fixedly secured to one of said shanks, a pair of links pivotally connected together, each of said links further pivotally connected to one of the handle members, and each of said handle members further provided with a lengthwise extending lug overlapping the mirror connected with the holder member by said extensions.

In testimony whereof, I affix my signature hereto.

FRANK BOSLER.